(12) United States Patent
Dietrich et al.

(10) Patent No.: US 6,709,508 B2
(45) Date of Patent: Mar. 23, 2004

(54) DRY MORTAR FORMULATIONS MODIFIED WITH WATER-REDISPERSIBLE POLYMER POWDERS

(75) Inventors: Ulf Dietrich, Burghausen (DE); Theo Mayer, Julbach (DE)

(73) Assignee: Wacker Polymer Systems GmbH & Co. KG, Munich (DE)

( * ) Notice: Subject to any disclaimer, the term of this patent is extended or adjusted under 35 U.S.C. 154(b) by 66 days.

(21) Appl. No.: 10/145,326

(22) Filed: May 14, 2002

(65) Prior Publication Data

US 2003/0005861 A1 Jan. 9, 2003

(30) Foreign Application Priority Data

May 17, 2001 (DE) .......................................... 101 23 938

(51) Int. Cl.⁷ ........................... C04B 14/28; C04B 24/00
(52) U.S. Cl. ...................... 106/724; 106/725; 106/726; 106/727; 106/728; 106/730; 106/734; 106/772; 106/802; 106/805; 106/808; 106/809; 106/810; 106/817; 427/427
(58) Field of Search ................................. 106/724, 725, 106/726, 727, 728, 730, 734, 802, 805, 808, 809, 810, 817, 778; 427/427

(56) References Cited

U.S. PATENT DOCUMENTS 6,270,692 B1    8/2001  Geissler et al.

FOREIGN PATENT DOCUMENTS

| DE | 1 951 171 | 4/1971 |
| DE | 197 30 953 A1 | 2/1998 |
| DE | 198 43 730 A1 | 3/2000 |
| EP | 0 751 175 A2 | 1/1997 |
| EP | 0 751 175 B1 | 10/1999 |

OTHER PUBLICATIONS

Ullmanns Encyclopedia of Industrial Chemistry, vol. A3, p. 91ff, 1985.

*Primary Examiner*—Paul Marcantoni
(74) *Attorney, Agent, or Firm*—Brooks Kushman P.C.

(57) ABSTRACT

Dry mortar formulations comprising
 a) from 0.5 to 80% by weight of hydraulic binder,
 b) from 0 to 97% by weight of fillers,
 c) from 0 to 3.5% by weight of thickeners,
 d) from 1.0 to 80% by weight of redispersible polymer powder, and
 e) from 0.0001 to 1.0% by weight of antioxidants exhibit improved tensile strength and other set mortar properties, particularly after storage of the dry mortar composition.

16 Claims, No Drawings

DRY MORTAR FORMULATIONS MODIFIED WITH WATER-REDISPERSIBLE POLYMER POWDERS

BACKGROUND OF THE INVENTION

1. Field of the Invention

The invention relates to dry mortar formulations modified with water-redispersible polymer powders which exhibit improved tensile adhesion properties when used as adhesives and coating materials.

2. Background Art

Mixtures of hydraulic binder such as cement or gypsum, and water-redispersible polymer powders are known. The redispersible powder is added as an organic binder to improve adhesion to the substrate and the flexibility of the coating. Further ingredients of these mixtures include fillers, as well as thickeners for controlling the Theological properties. Conventional additives also include dispersants, cement plasticizers, and additives for accelerating or retarding setting. One example of a mortar base mix is disclosed in DE-A 1951171.

Such mixtures are prepared by stirring with water and then used, for example, in construction adhesives such as tile adhesives or exterior insulation and finishing system (EIFS) adhesives, troweling compositions, leveling compounds, grouts, reinforcing mortars for exterior insulation and finishing systems (EIFS), and as adhesives for bonding wood flooring. When such mortar compounds are employed, a disadvantage is that the tensile bond strengths obtained are not entirely satisfactory. In particular, a decrease in the tensile bond strength is often found when the dry mortars have been stored for prolonged periods prior to use.

DE-A 19843730 and EP-B 751175 disclose that polymer powders can be prevented from self-igniting by adding antioxidants.

It would be desirable to provide dry mortar formulations which when used as adhesives or coating materials bring about good tensile bond strength.

SUMMARY OF THE INVENTION

The present invention is directed to dry mortar compositions employing water-redispersible polymer powders which produced cured (set) products exhibiting good tensile bond strength irrespective of dry storage time. The compositions contain, in addition to the conventional mortar components, a redispersible polymer powder and an antioxidant.

DETAILED DESCRIPTION OF THE PREFERRED EMBODIMENT(S)

The invention provides dry mortar formulations comprising
  a) from 0.5 to 80% by weight of hydraulic binder,
  b) from 0 to 97% by weight of fillers,
  c) from 0 to 3.5% by weight of thickeners,
  d) from 1.0 to 80% by weight of redispersible polymer powder, and
  e) from 0.0001 to 1.0% by weight of one or more antioxidant compounds,
the percentage by weight based on the overall weight of the dry mortar, and totaling 100% by weight. The descriptions of the various ingredients set forth below are non-limiting.

The hydraulic binder fraction a) is preferably from 0.5 to 70% by weight, with particular preference given to 8 to 50% by weight. Generally, cement or gypsum is used. Preference is given to using Portland cement.

Suitable fillers b) are quartz sand, quartz flour, calcium carbonate, dolomite, aluminum silicates, talc, and mica; lightweight fillers such as pumice, foamed glass, aerated concrete, perlites or vermiculites; and fillers based on natural or synthetic fibers. Mixtures of these fillers may also be used. The filler fraction is preferably from 10 to 90% by weight, more preferably from 40 to 90% by weight, and most preferably from 75 to 90% by weight.

Examples of thickeners c) are polysaccharides such as cellulose ethers and modified cellulose ethers, starch ethers, guar gum, xanthan gum, phyllosilicates, polycarboxylic acids such as polyacrylic acid and the partial esters thereof, optionally acetalized and/or hydrophobically modified polyvinyl alcohols, casein, and associative thickeners. It is also possible to use mixtures of these thickeners. Preference is given to cellulose ethers, modified cellulose ethers, optionally acetalized and/or hydrophobically modified polyvinyl alcohols, and mixtures thereof. It is preferred to use from 0.05 to 2.5% by weight, more preferably from 0.05 to 0.8% by weight of thickeners.

Water-redispersible polymer powders d) are those which in water break down into primary particles, which are then dispersed in the water. Suitable polymers, for example, are those based on one or more vinyl esters of unbranched or branched alkylcarboxylic acids having from 1 to 15 carbon atoms, methacrylic esters and acrylic esters of alcohols having from 1 to 10 carbon atoms, vinyl-aromatics, olefins, dienes, and vinyl halides as monomers or comonomers. It is also possible to use mixtures of these polymers. Preference is given to using from 1 to 10% by weight of water-redispersible polymer powders d).

Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of alpha-branched monocarboxylic acids having from 5 to 11 carbon atoms, examples being VeoVa5®, VeoVa9®, VeoVa10® or VeoVa11® (trade names of Shell). Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, and 2-ethylhexyl acrylate. Preferred vinyl-aromatics are styrene, methylstyrene, and vinyltoluene. A preferred vinyl halide is vinyl chloride. The preferred olefins are ethylene and propylene, and the preferred dienes are 1,3-butadiene and isoprene.

If desired, the polymers may also contain from 0.1 to 10% by weight, based on the overall weight of the polymer, of functional comonomer units, for example ethylenically unsaturated monocarboxylic or dicarboxylic acids such as acrylic acid; ethylenically unsaturated carboxamides such as (meth)acrylamide; ethylenically unsaturated sulfonic acids and/or their salts, preferably vinylsulfonic acid; polyethylenically unsaturated comonomers such as divinyl adipate, diallyl maleate, allyl methacrylate and triallyl cyanurate, and/or N-methylol(meth)acrylamides and their ethers, such as their isobutoxy or n-butoxy ethers.

Particularly preferred polymers are those listed below, the weight percentages adding up to 100% by weight, together, where appropriate, with the fraction of functional comonomer units:

From among the vinyl ester polymers: vinyl acetate polymers, vinyl acetate-ethylene copolymers with an ethylene content of from 1 to 60% by weight; vinyl ester-ethylene-vinyl chloride copolymers with an ethylene content of from 1 to 40% by weight and a vinyl chloride content of from 20 to 90% by weight; vinyl acetate copolymers with from 1 to 50% by weight of one or more copolymerizable vinyl esters such as vinyl laurate, vinyl pivalate, vinyl esters of an alpha-branched carboxylic acid, especially Versatic acid vinyl esters (VeoVa9®, VeoVa10®, VeoVa11®), which may also contain from 1 to 40% by weight of ethylene; and vinyl acetate-acrylic ester copolymers with from 1 to 60% by weight of acrylic ester, especially methyl methacrylate, n-butyl acrylate, or 2-ethylhexyl acrylate, which may also contain from 1 to 40% by weight of ethylene.

From among the (meth)acrylic ester polymers: polymers of n-butyl acrylate or 2-ethylhexyl acrylate; copolymers of methyl methacrylate with n-butyl acrylate and/or 2-ethylhexyl acrylate; and copolymers of methyl methacrylate with 1,3-butadiene.

From among the vinyl chloride polymers, besides the abovementioned vinyl ester/vinyl chloride/ethylene copolymers: vinyl chloride-ethylene copolymers and vinyl chloride-acrylate copolymers.

From among the styrene polymers: styrene-1,3-butadiene copolymers and styrene-acrylic ester copolymers such as styrene-n-butyl acrylate or styrene-2-ethylhexyl acrylate copolymers, each with a styrene content of from 10 to 70% by weight. Most preferred are styrene-1,3-butadiene copolymers having a styrene content of from 10 to 70% by weight and a 1,3-butadiene content of from 30 to 90% by weight, with or without the abovementioned functional comonomer units, the fractions in % by weight adding up to 100% by weight.

Aqueous polymer dispersions and the water-redispersible powders of the abovementioned polymers that are obtainable from them by drying are known and are available commercially. The polymers are prepared in a conventional manner, preferably by an emulsion polymerization process. The dispersions used may be stabilized with emulsifier or else with a protective colloid, an example being polyvinyl alcohol. Preference is given to redispersible powders which are stabilized with protective colloid, especially those stabilized with partially hydrolyzed polyvinyl alcohols or with partially hydrolyzed, hydrophobically modified polyvinyl alcohols, in each case having a degree of hydrolysis of from 80 to 95 mol % and a Höppler viscosity in 4% strength aqueous solution of from 1 to 30 mPa·s (Höppler method at 20° C., DIN 53015). To prepare the water-redispersible polymer powders, the polymer dispersion is dried, preferably by means of spray drying.

Suitable antioxidants e) are known from the technical literature (Ullmanns Encyclopedia of Industrial Chemistry Vol. A3, page 91 ff., 1985) and are available commercially. Commonly used antioxidants include sterically hindered phenols or hydroquinones, aromatic amines such as diarylamines, arylamine-ketone condensation products, organosulfur compounds such as dialkyldithiocarbamic acids or dialkyldithiophosphites, and organophosphorus compounds such as phosphites or phosphonites. The fraction of the antioxidant e) in the dry mortar formulation is from 0.001 to 0.1% by weight.

Examples of sterically hindered phenols are alkylated phenols such as 2-t-butyl-4,6-dimethylphenol, 2,6-dioctadecyl-4-methylphenol, ortho-tert-butylphenol, 3,5-bis(1,1-dimethylethyl)-4-hydroxybenzenepropionic esters of $C_4$–$C_{22}$ alcohols, 2-methyl-4,6-bis(octylthio) 2-methyl-4,6-bis((octylthio)methyl)phenol, 3,5-bis(1,1-di-tert-butyl)-4-hydroxyphenylpropionic esters of $C_4$–$C_{22}$ alcohols; or alkylidenebisphenols such as 2,2'-methylenebis(6-tert-butyl-methylphenol), 1,1-bis(5-t-butyl-4-hydroxy-2-methylphenyl)butane; or phenolic benzyl compounds such as 1,3,5-tri(3,5-di-t-butyl-4-hydroxybenzyl)-2,4,6-trimethylbenzene, 1,3,5-tris(4-t-butyl-3-hydroxy-2,6-dimethylbenzyl) isocyanurate; or 3,5-di-t-butyl-4-hydroxyphenylpropionic esters, 5-t-butyl-4-hydroxy-3-methylphenylpropionic esters, 3,5-di-t-butyl-4-hydroxyphenylpropionamides, and 3,5-di(1,1-dimethylethyl)-4-hydroxybenzenepropionic esters. Examples of sterically hindered hydroquinones are 2,6-di-t-butyl-4-methoxyphenol and 2,5-di-t-butylhydroquinone. Examples of aromatic amines and arylamine-ketone condensation products are N,N'-bis(1,4-dimethylpentyl)-p-phenylenediamine, N,N'-diphenyl-p-phenylenediamine, 4-(p-toluenesulfonamido)diphenylamine, and 4-n-butylaminophenol. Examples of organosulfur compounds are 4,4'-thiobis(6-t-butyl-3-methylphenol), dilauryl 3,3'-thiodipropionate, and distearyl 3,3'-thiodipropionate. Examples of organophosphorus compounds are dioctadecyl 3,5-di-t-butyl-4-hydroxybenzylphosphonate, trimethyl phosphite, triethyl phosphite, and triphenyl phosphite.

The dry mortar formulation may further comprise up to 5% by weight of other additives such as accelerators, retardants, dispersants, standardizers, air pore formers, and natural or polymer fibers.

Most preferred are compositions comprising
a) from 8 to 50% by weight of cement,
b) from 40 to 90% by weight of one or more calcium carbonate and/or quartz sand fillers,
c) from 0.05 to 0.8% by weight of one or more cellulose ether, modified cellulose ether, polyvinyl alcohol, and/or acetalized and/or hydrophobically modified polyvinyl alcohol fillers,
d) from 1 to 10% by weight of polyvinyl-alcohol-stabilized redispersible polymer powder based on one or more monomers from among the vinyl esters of unbranched or branched alkylcarboxylic acids having from 1 to 15 carbon atoms, methacrylic esters and acrylic esters of alcohols having from 1 to 10 carbon atoms, vinylaromatics, olefins, dienes, and vinyl halides, and
e) from 0.001 to 0.1% by weight of one or more sterically hindered phenol or hydroquinone, aromatic amine, organosulfur compound, phosphite and phosphonite antioxidants, the fractions a) to e) being based in each case on the overall weight of the dry mortar and adding up to 100% by weight.

The dry mortar formulation is generally prepared by mixing components a) to e) to a dry mortar in conventional powder mixers and homogenizing the mixture. The amount of water needed for processing is added immediately prior to processing. Another possible procedure is to add individual components only subsequently to the mixture prepared by stirring with water. The antioxidant e) may also be added beforehand to the redispersible powder d) or added during spray drying to prepare the redispersible powder d), and may subsequently be mixed with the other components of the dry mortar.

The mortar compounds obtainable with the dry mortar formulation are suitable as adhesives, preferably construction adhesives, particularly as tile adhesives and as adhesives for bonding insulating panels and soundproofing panels. Further applications include that as a reinforcing compound for exterior insulation and finish systems, as a troweling compound, and as a coating material (render), and for bonding wood and wood materials, for bonding to insulating panels, and as grouts.

Particular preference is also given to use in gypsum compositions such as gypsum renders (plasters) and gypsum troweling compounds. Such compositions may contain from 15 to 80% by weight of gypsum (anhydrite), from 3 to 97% by weight of fillers, from 0 to 5% by weight of hydrated lime, from 0.01 to 3% by weight of thickeners, from 0 to 5% by weight of redispersible powders, and from 0 to 2% by weight of further additives (i.e, retardants).

For the purpose of testing, the following dry mortar formulations were prepared:

Example 1

300.0 g of cement (OPC CEM 42.5) (a)
150.0 g of quartz sand (No. 12) (b)
465.0 g of quartz sand (F 32) (b)
3.0 g of cellulose ether thickener (Tylose FL 15002) (c)
48.3 g of redispersible powder (polyvinyl-alcohol-stabilized styrene-1,3-butadiene copolymer (d)
0.05 g of antioxidant (Anox® BF, 3,5-bis(1,1-di-t-butyl-4-hydroxyphenyl)propionic ester of $C_{14}$–$C_{15}$ alcohols) (e)
The dry mortar formulation was processed immediately after blending to form a construction adhesive.

Comparative Example C2

300.0 g of cement (OPC CEM 42.5) (a)
150.0 g of quartz sand (No. 12) (b)
465.0 g of quartz sand (F 32) (b)
3.0 g of cellulose ether thickener (Tylose FL 15002) (c)
48.3 g of redispersible powder (polyvinyl-alcohol-stabilized styrene-1,3-butadiene copolymer (d)
The dry mortar formulation was processed immediately after blending to form a construction adhesive.

Example 3

A dry mortar formulation as per example 1 was stored at 50° C. with ingress of air for 21 days.

Comparative Example C4

A dry mortar formulation as per example 2, comparative, was stored at 50° C. with ingress of air for 21 days.

In order to test the mechanical properties, a construction adhesive was produced from the dry mortar formulations, on the one hand immediately after blending, on the other following the storage period and cooling to room temperature, in each case by mixing in 240 g of water.
Determination of the Tensile Bond Strengths:

For testing, the construction adhesives of examples 1 to 4 were each applied to concrete paving slabs using a 5 mm toothed trowel. Then 5 tiles (5×5 cm) were laid on each slab and weighted down for 30 seconds using a 2 kg weight.

The tensile bond strengths were tested in each case after the following storage conditions to DIN CEN 1897:
Storage under standard conditions (SC):
28 days at 23° C. and 50% humidity.
Wet storage (WS):
7 days of storage under standard conditions followed by 21 days of storage at 20° C. in water.
Hot storage (HS):
14 days of storage under standard conditions followed by 14 days of storage at 70° C.
Freeze/thaw storage (FT):
7 days of storage under standard conditions followed by 21 days of storage at 20° C. in water and then 25 of freeze/thaw cycling from frost storage at −15° C. to water storage at +20° C. for 2 hours in each case.

The tensile bond strengths were determined in accordance with DIN 18156, in each case following the abovementioned storage, using a pulloff device from Herion, with a load increase rate of 250 N/s. The measurements, in N/mm², represent mean values of 5 measurements.

TABLE 1

| Storage conditions of set composition | Example 1 (N/mm²) (fresh) | Example 3 (N/mm²) (stored) | Example C2 (N/mm²) (fresh) | Example C4 (N/mm²) (stored) |
| --- | --- | --- | --- | --- |
| Standard conditions SC | 2.31 | 2.28 | 2.26 | 1.09 |
| Wet storage WS | 1.38 | 1.33 | 1.14 | 0.88 |
| Hot storage HS | 1.8 | 1.88 | 1.67 | 0.38 |
| Freeze/thaw storage FT | 1.29 | 1.32 | 1.16 | 1.17 |

The test results show that high tensile bond strengths when used in construction compositions are achieved with the dry mortar formulation of the invention, independently of the dry mortar storage time. The comparative formulation, in contrast, exhibits a marked loss in mechanical strength on application.
Example of a Hand-Applied Plaster:
700.0 g of Primoplast (Hilliges Gipswerke) (a)
224.3 g of quartz sand (No. 7) (b)
25.0 g of lightweight filler (perlite 3.0 mm) (b)
35.0 g of lime hydrate (Walhalla)
0.4 g of retardant (Retardan P)
2.0 g of cellulose thickener (Tylose FL 15002) (c)
0.3 g of starch ether (Walocel VP-ST 2793)
13.0 g of redispersible powder (d)
0.05 g of antioxidant (Anox® BF) (e)
Example of a Gypsum Troweling Compound:
320.0 g of Primoplast (Hilliges Gipswerke) (a)
621.0 g of carbonate filler (Omyacarb 2-BG) (b)
30.0 g of mica (micafine, type 2002) (b)
35.0 g of lime hydrate (Walhalla)
0.5 g of accelerator (calcium hydrogen phosphate)
3.0 g of cellulose thickener (Walocel MKX4000PF50) (c)
0.5 g of starch ether (Walocel VP-ST 2793) (c)
15.0 g of redispersible powder (d)
0.05 g of antioxidant (Anox® BF) (e)

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The terms "a" and "an" mean "one or more" unless indicated to the contrary.

What is claimed is:

1. A dry mortar formulation comprising
   a) from 0.5 to 80% by weight of a hydraulic binder,
   b) from 0 to 97% by weight of a filler,
   c) from 0 to 3.5% by weight of a thickener,
   d) from 1.0 to 80% by weight of a redispersible polymer powder, and
   e) from 0.0001 to 1.0% by weight of an antioxidant the percentages by weight based on the overall weight of the dry mortar, and totaling 100% by weight.

2. The mortar of claim 1, comprising as redispersible polymer powders d) a redispersible polymer powder based on one or more unbranched $C_{1-15}$ alkylcarboxylic acid vinyl ester monomers, branched $C_{1-15}$ alkylcarboxylic acid vinyl ester monomers, $C_{1-10}$ alcohol (meth)acrylic acid ester monomers, vinylaromatic monomers, olefin monomers, diene monomers, or vinyl halide monomers.

3. The mortar of claim 1, comprising as antioxidants e) one or more sterically hindered phenol antioxidants, sterically hindered hydroquinone antioxidants, aromatic amine antioxidants, organosulfur compound antioxidants, phosphite antioxidants, or phosphonite antioxidants.

4. A dry mortar formulation comprising
   a) from 8 to 50% by weight of cement,
   b) from 40 to 90% by weight of calcium carbonate and/or quartz sand fillers,
   c) from 0.05 to 0.8% by weight of one or more cellulose ether thickeners, modified cellulose ether thickeners, polyvinyl alcohol thickeners, or acetalized and/or hydrophobically modified polyvinyl alcohol thickeners,
   d) from 1 to 10% by weight of polyvinyl-alcohol-stabilized redispersible polymer powder, said polymer powder based on one or more unbranched $C_{1-15}$ alkylcarboxylic acid vinyl ester monomers, branched $C_{1-15}$ alkylcarboxylic acid vinyl ester monomers, $C_{1-10}$ alcohol (meth)acrylic acid ester monomers, vinylaromatic monomers, olefin monomers, diene monomers, or vinyl halide monomers, and
   e) from 0.001 to 0.1% by weight of one or more sterically hindered phenol antioxidants, sterically hindered hydroquinone antioxidants, aromatic amine antioxidants, organosulfur compound antioxidants, phosphite antioxidants, or phosphonite antioxidants.

5. The dry mortar of claim 1 wherein said hydraulic binder comprises gypsum.

6. A process for preparing the mortar of claim 1, comprising mixing components a) to e) in a powder mixer.

7. A process for preparing the mortar of claim 1, wherein the antioxidant e) is added to a redispersible polymer powder d) or added during spray drying when preparing the redispersible powder d), and subsequently mixing the antioxidant-containing polymer powder with the other components of the dry mortar.

8. A process for preparing a mortar compound using a mortar composition of claim 1, comprising adding individual components a) to e) to water and agitating to form a mortar compound.

9. In a process for adhesively loading or coating a substrate wherein a mortar compound is employed, the improvement comprising admixing the dry mortar of claim 1 with water to form a mortar compound, and applying said mortar compound to said substrate.

10. The process of claim 9, wherein said substrate is a tile.

11. The process of claim 9, wherein said substrate comprises an insulation panel or a soundproofing panel.

12. The process of claim 9, wherein said mortar compound is a reinforcing compound for exterior insulation and finish systems.

13. The process of claim 9, wherein said mortar compound is a troweling compound.

14. The process of claim 9, wherein said mortar compound is a grout.

15. An adhesive, render, reinforcing compound, troweling compound, or grout comprising the dry mortar of claim 1 and water.

16. A gypsum plaster or gypsum troweling compound comprising the dry mortar of claim 5 and water.

* * * * *